US005407518A

United States Patent [19]

Baley, Jr.

[11] Patent Number: 5,407,518

[45] Date of Patent: Apr. 18, 1995

[54] DEVICE FOR SEPARATING A TONER CARTRIDGE

[76] Inventor: Raymond Baley, Jr., 1324 Fox Forrest Cir., Apopka, Fla. 32712

[21] Appl. No.: 83,348

[22] Filed: Jun. 28, 1993

Related U.S. Application Data

[63] Continuation-in-part of Ser. No. 825,850, Jan. 27, 1992, Pat. No. 5,223,068.

[51] Int. Cl.[6] .............................................. B32B 35/00

[52] U.S. Cl. ...................................... 156/344; 156/94; 156/257; 156/584; 156/510; 83/876; 83/885; 83/704; 29/402.02; 29/402.03; 264/36

[58] Field of Search ................. 156/257, 344, 584, 94, 156/510; 83/869, 876, 885, 703, 704; 264/36; 29/402.02, 402.03

[56] References Cited

U.S. PATENT DOCUMENTS

| | | | |
|---|---|---|---|
| 780,891 | 1/1905 | Kistler | 83/704 |
| 1,928,811 | 10/1933 | Burns | 83/704 X |
| 2,145,568 | 1/1939 | Faber | 83/704 |
| 3,736,829 | 6/1973 | Pedi | 83/703 X |
| 4,955,124 | 9/1990 | Asbery | 29/402.3 X |
| 4,997,323 | 3/1991 | Giandalia | 83/869 X |

*Primary Examiner*—David A. Simmons
*Assistant Examiner*—Paul M. Rivard
*Attorney, Agent, or Firm*—Wallenstein, Wagner & Hattis, Ltd.

[57] ABSTRACT

The present invention is a device for separating a toner cartridge hopper from its mounting member so that the cartridge can be reliably resealed and refilled with toner for repeated use. A container holds the cartridge while leaving the outer edge of the gasket exposed. In one embodiment, the container is provided with wheels that travel in a track. The container moves linearly along the track past a blade that cuts away the outer edge of the gasket. In a second embodiment, the container is positioned on a rail aligned to pass between two spaced-apart blades. The rail is mounted on a linear bearing so that the rail moves linearly past the blades to remove both gasket outer edges in a single pass. By removing the outer edges of the gasket, the welds that join the hopper and mounting member to the gasket are broken and the hopper can be separated from the mounting member.

28 Claims, 7 Drawing Sheets

DEVICE FOR SEPARATING A TONER CARTRIDGE

The present invention is a continuation-in-part of prior patent application Ser. No. 825,850, filed Jan. 27, 1992, now U.S. Pat. No. 5,223,068.

DESCRIPTION

1. Technical Field

The present invention relates to a device for separating a toner cartridge hopper from its mounting member so that the cartridge can be reliably resealed and refilled with toner for repeated use.

2. Background Prior Art

Many image-forming apparatus utilize the xerographic printing process, examples being laser printers, copy machines, micrographic printers and facsimile machines. These image-forming apparatus use toner to print or copy the desired image or words onto a piece of paper. The toner is contained in a hopper which must be refilled periodically. For example, the toner in a laser printer must be refilled after printing approximately 3000 pages.

The process of refilling the toner hopper has proven to be difficult and messy. Toner, the "ink" of the print or copy machine, is a powdery substance that must be applied evenly across the surface of a drum during use. However, toner that leaks out of the hopper during shipping can accumulate on the drum and cause blotching, streaking or voiding of prints and copies. Toner leakage can also cause moving parts to wear out more rapidly and can even short out the electrical components in the cartridge. In these ways, toner leakage reduces the quality of prints and copies, increases maintenance costs, and can even decrease the useful life of the image-forming machine.

To resolve the problems associated with toner leakage, Canon and Hewlett Packard developed a disposable toner cartridge. This cartridge typically includes a toner hopper, a seal assembly, a mounting member, a magnetic roller assembly, a drum assembly and a corona assembly. By combining these components into a single cartridge, toner is applied evenly across the surface of the drum without leaking out of the hopper during shipping. Unfortunately, this cartridge design is relatively expensive. In addition, the magnetic roller, drum and corona assemblies last considerably longer than 3000 pages. Thus, the disposal of the entire cartridge results in unnecessary waste of material and landfill space—the costs being passed on to the consumers.

Toner leakage is prevented by the seal assembly which is typically provided with a removable seal member. Once this seal member is removed, toner is allowed to flow out of the toner hopper discharge opening and across the surface of the drum. Removal of the seal member also allows toner to permeate throughout the entire cartridge if shaken or flipped upside down. Consequently, the seal member is usually not removed until after the cartridge has been inserted into an image-forming machine. Replacement of the removable seal member is essential if the cartridge is to be refilled and reused.

The problem of replacing the removable seal member is that the toner hopper discharge opening is obstructed by the mounting member. In fact, the mounting member is typically welded directly to the periphery of the toner discharge opening. Breaking the welds and inserting a replacement seal is an extremely difficult and labor intensive process. The hopper and mounting member are typically plastic, and not easily separated given the strength of the welds. Great care must be taken not to damage the hopper and mounting members. This additional labor can increase the cost of a resealed cartridge above that of an original cartridge.

To avoid the cost of separating the mounting member from the hopper, some companies have developed a method of force-fitting a replacement seal into a used cartridge. The replacement seal is force-fit into a slot between the toner hopper and the mounting member so as to cover the toner discharge opening. A few of the companies using this method are Future Graphics, New England Seal and Avolanche Technologies. The problem with the force-fit method is that the replacement seals are unreliable and often allow toner to leak out of the hopper during shipping.

The present invention is provided to solve these and other problems.

SUMMARY OF THE INVENTION

The present invention is a device for separating a toner cartridge hopper from its mounting member so that the cartridge can be reliably resealed and refilled with toner for repeated use. A container holds the cartridge while leaving the outer edge of the gasket exposed. In one embodiment, the container is provided with wheels that travel in a track. The container moves linearly along the track past a blade that cuts away the outer edge of the gasket. In a second embodiment, the container is positioned on a rail aligned to pass between two spaced-apart blades. The rail is mounted on a linear bearing so that the rail moves linearly past the blades to remove both gasket outer edges in a single pass. By removing the outer edges of the gasket, the welds that join the hopper and mounting member to the gasket are broken and the hopper can be separated from the mounting member.

One advantage of the present invention is that the hopper and mounting member are quickly and efficiently separated from the thin flat gasket without damaging the peripheral portions of the hopper and mounting member. The cartridge is aligned with and moves linearly past the blades which remove the outer edges of the gasket while leaving the peripheral portions of the hopper and mounting member intact so that a new seal assembly may be applied.

An additional advantage of the present invention is that it provides an effective means for holding the toner cartridge while allowing access for the blade to cut away the outer edges of the gasket. The container stabilizes the peripheral portions of the hopper and mounting member so that they are not damaged during the cutting process.

A further advantage of the invention is that differently shaped containers may be used to handle a variety of cartridge brands and models being sold. One container can be quickly removed and replaced with another to facilitate such changes.

Other features and advantages of the invention will be apparent from the following specification taken in conjunction with the following drawings.

DETAILED DESCRIPTION

Figure 1:
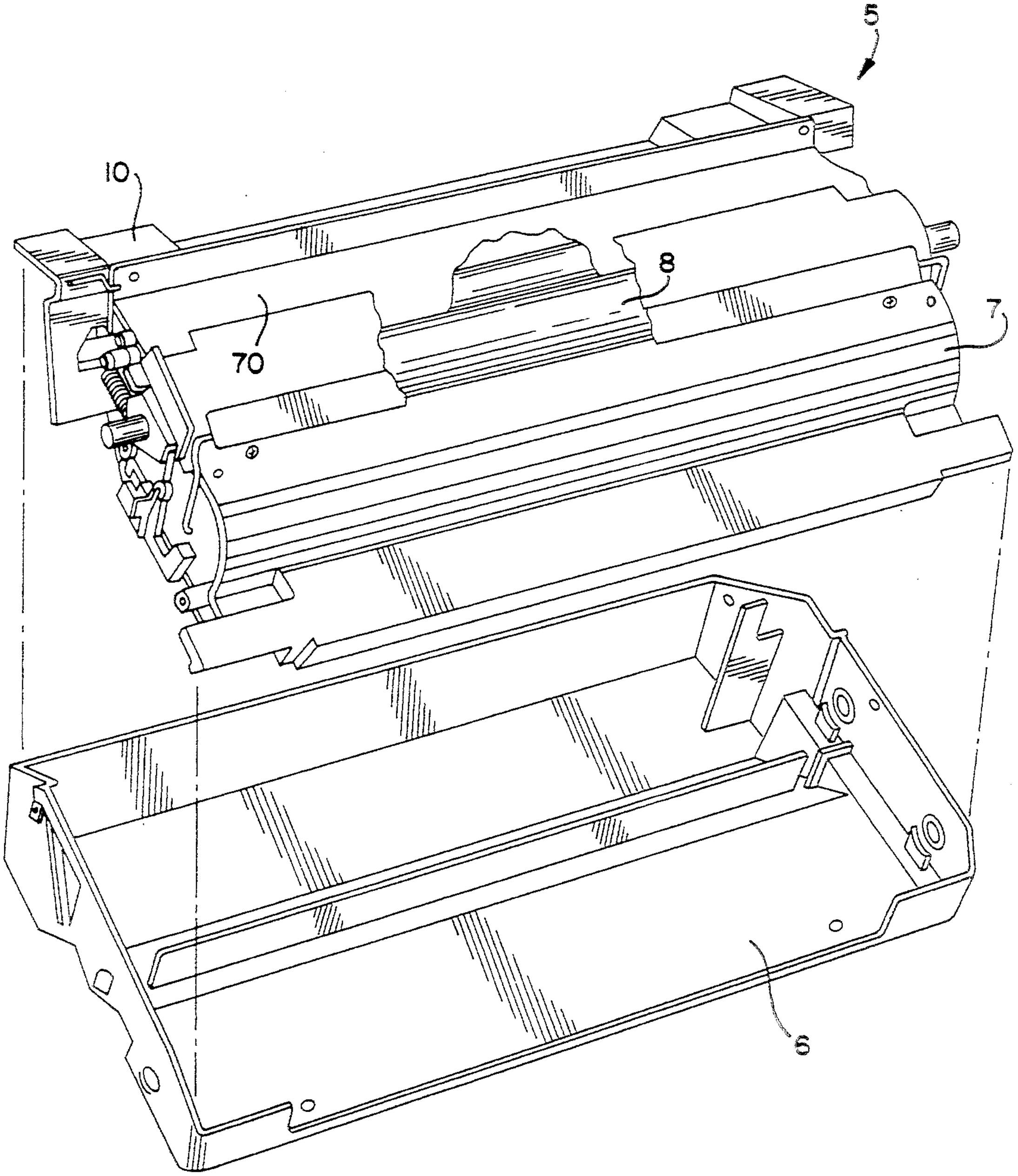
FIG. 1 is an exploded, cut-away view of a toner cartridge.

While the disclosed invention is susceptible of embodiments in many different forms, there is shown in the drawings and will herein be described in detail, preferred embodiments of the invention with the understanding that the present disclosure is to be considered as an exemplification of the principles of the invention and is not intended to limit the broad aspects of the invention to the embodiments illustrated.

Figure 2:
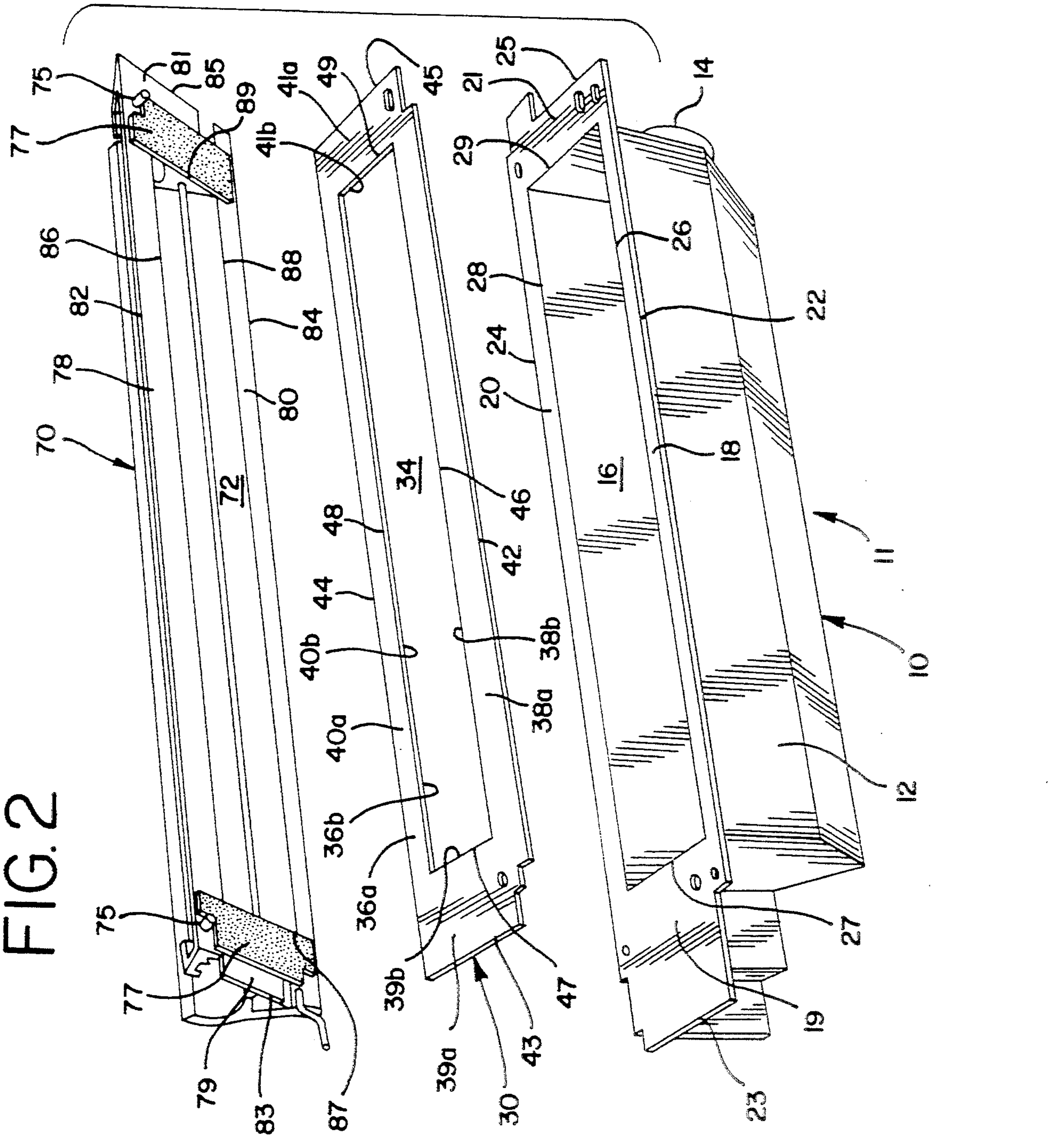
FIG. 2 is an exploded view of a used hopper/mounting member subassembly.

A typical used cartridge 5 is shown in FIG. 1. This cartridge 5 is generally comprised of a shell 6, a waste toner bin 7, a drum assembly 8, a toner hopper 10 and a mounting member 70. The cartridge 5 can be disassembled until only a hopper-mounting member subassembly 11 remains. This subassembly 11 is comprised of hopper 10, mounting member 70, and gasket 30 as shown in FIG. 2. Subassembly 11 is typically ultrasonically welded together as will be discussed later.

Toner hopper 10 has a hollow bin 12, a toner refill opening 14 and a toner discharge opening 16. Discharge opening 16 is defined by peripheral portions 18–21 which are generally flat for receiving the gasket 30. Peripheral portions 18–21 are defined by outer edges 22–25 and inner edges 26–29 respectively.

Gasket 30 has a top surface area **36*a* comprised of surfaces 38*a*–41*a*, and a bottom surface area 36*b* comprised of surfaces 38*b*–41*b*. Top and bottom surface areas 36*a* and 36*b* are defined by outer edges 42–45, and inner edges 46–49. Gasket bottom surface area 36*b* is flat and shaped to engage hopper peripheral portions 18–21. Gasket top surface area 36a is also flat and shaped to engage peripheral portions 78–81 of mounting member 70. Gasket lengthwise outer edges 42 and 44 are flush with hopper outer edges 22 and 24. Gasket inner edges 46–49 define a gasket opening 34**.

Mounting member 70 has peripheral portions 78–81 which define mounting member opening 72. Peripheral portions 78–81 are generally flat and shaped to uniformly engage and attach to gasket top surface area **36*a*. Peripheral portions 78–81 are defined by outer edges 82–85 and inner edges 86–89** respectively.

Prior to installation and use, original subassembly 11 has a removable seal member (not shown) attached to gasket top surface **36*a*. This removable seal member is placed over gasket opening 34 and is removably attached to the inner edges 46–49 of gasket top surface 36*a*. Attached in this way, the removable seal member prevents toner from passing through gasket opening 34 until cartridge 5** is installed and the seal member is removed.

Cartridge subassembly 11 is typically joined together by ultrasonic welds. Hopper 10 is attached to gasket 30 by ultrasonically welding the outer edges 42–45 of gasket surface **36*b* to hopper peripheral portions 18--21. This forms a hopper-gasket seal that prevents toner from leaking between the two members. Mounting member 70 is attached to gasket 30 by ultrasonically welding lengthwise outer edges 78 and 80 of mounting member peripheral portions 78 and 80 to lengthwise outer edges 42 and 44 of gasket surfaces 38*b* and 40*b*. No welds are provided between gasket surfaces 39*b* and 41*b* and mounting member peripheral portions 79 and 81. Instead, seals 77 are attached to mounting member peripheral portions 79 and 81 to prevent toner from leaking after the seal member has been removed. It should be understood that although ultrasonic welds are typically used to join original subassembly 11** together, the following device is applicable where heat welds, glues, adhesives, resins or other similar means are used.

Figure 3:
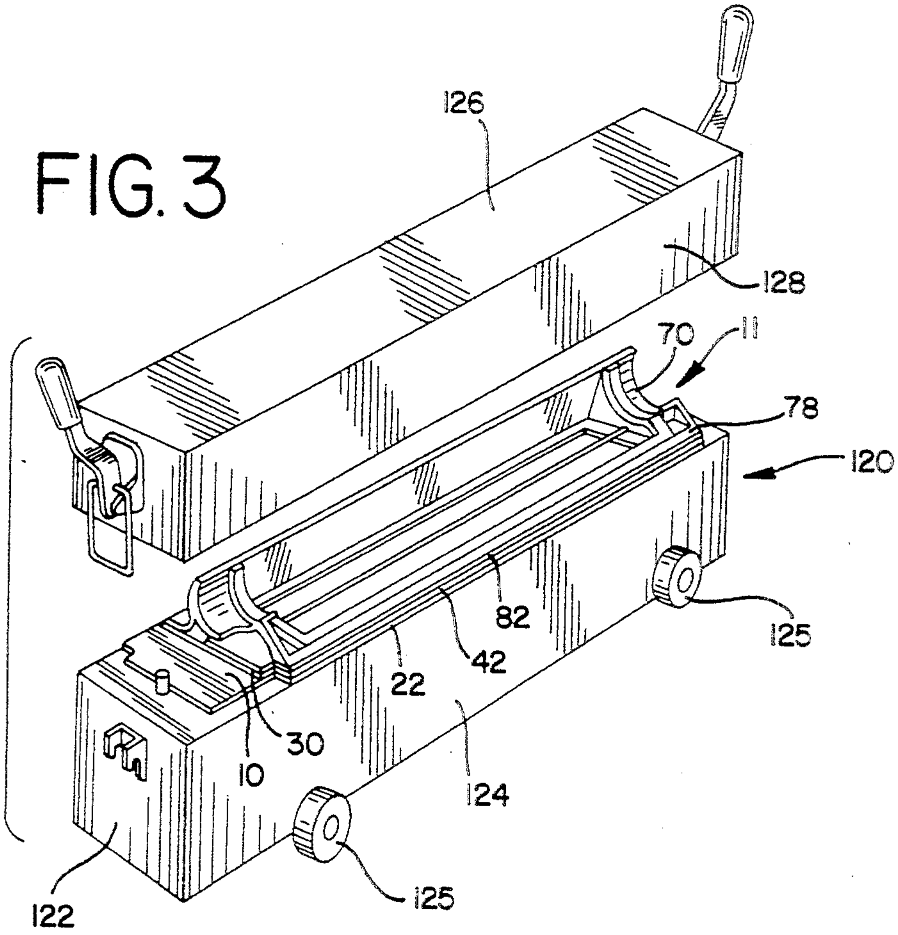
FIG. 3 is a perspective view of a used cartridge subassembly being placed into a cart.
Figure 5:
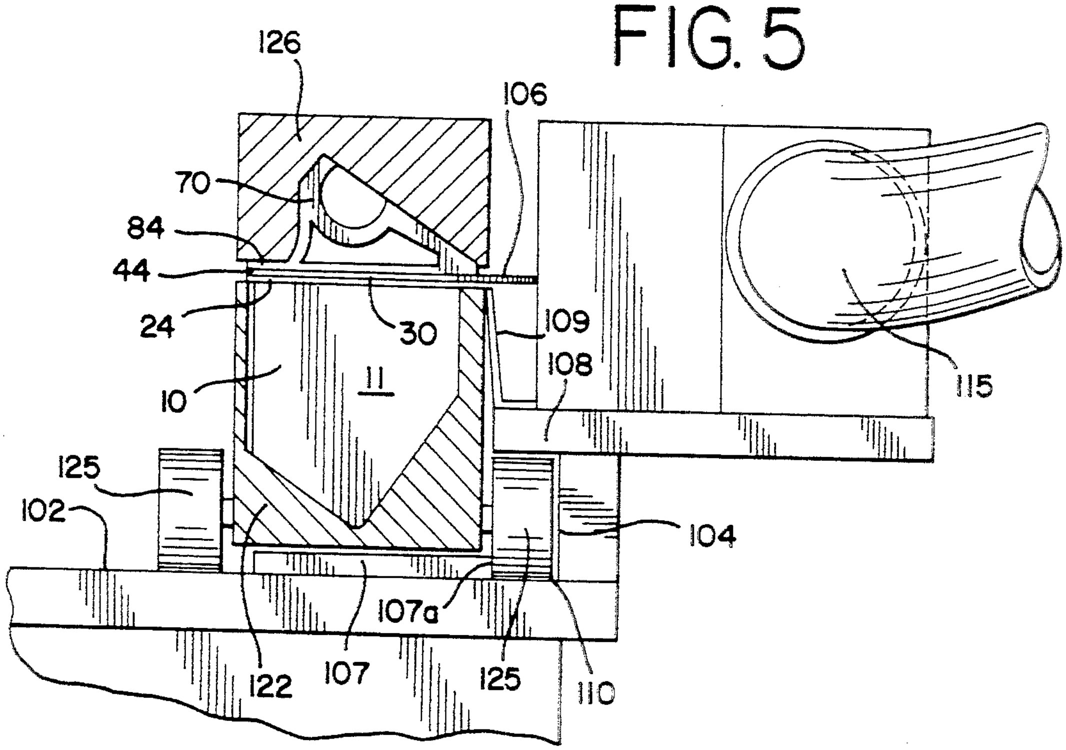
FIG. 5 is a sectional view of a blade cutting away the outer edge of a cartridge gasket.
Figure 4:
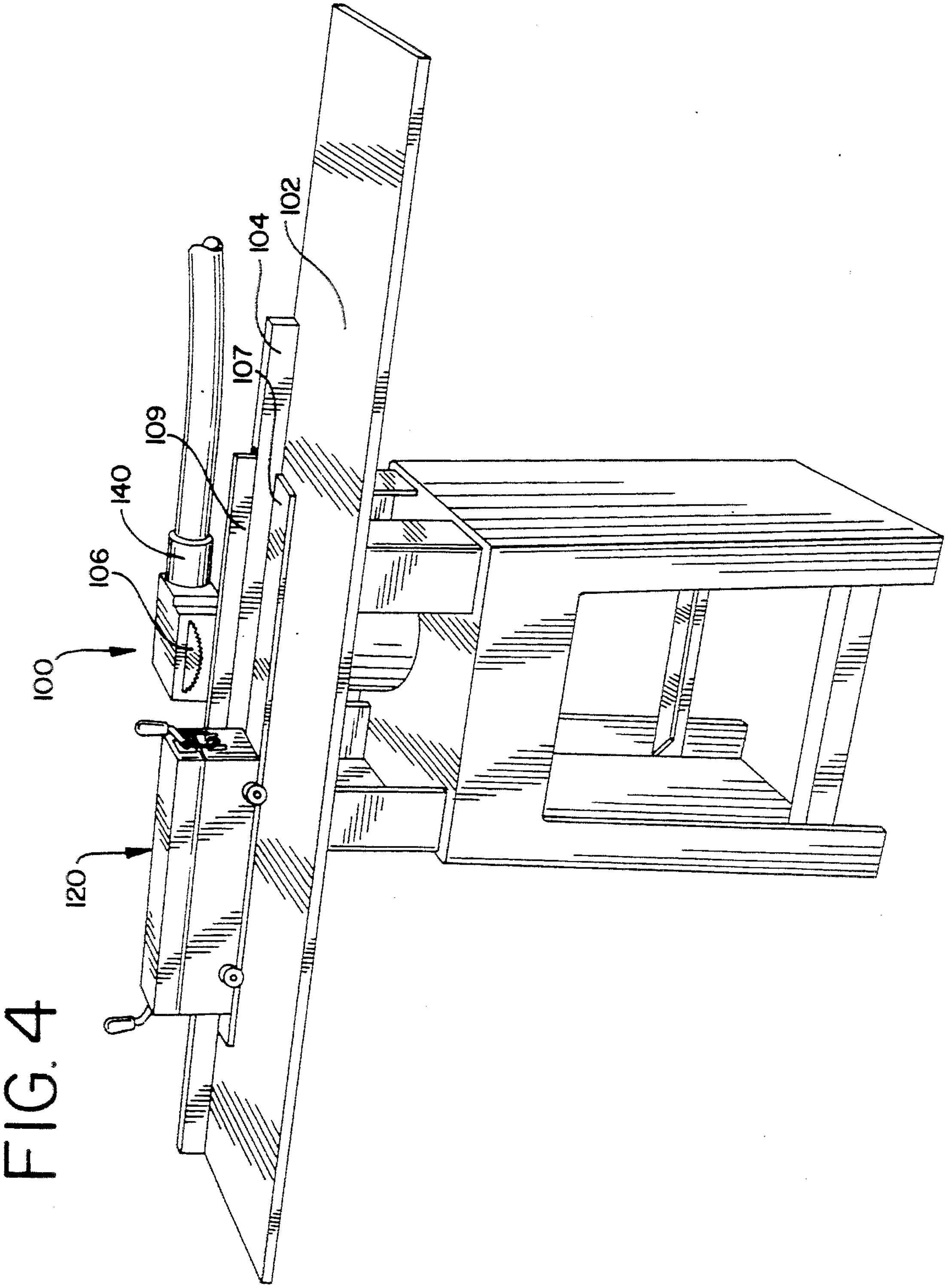
FIG. 4 is a perspective view of a cart placed on a reference surface of the device.

The method of reconditioning and resealing a used cartridge begins by disassembling the used cartridge 5 until only subassembly 11 remains. Removal of the other components facilitates handling during the reconditioning and resealing process and prevents inadvertent damage to the other components. Cartridge subassembly 11 is held by, aligned with and moved past a device 100 or 140 to remove gasket lengthwise outer edges 42 and 44. FIGS. 3–5 show a first embodiment of the device 100. FIGS. 6–11 show a second embodiment of device 140. Grizzley Imports of Bellingham, Wash. manufactures a router that can be redesigned to form device 100 or device 140.

Figure 6:
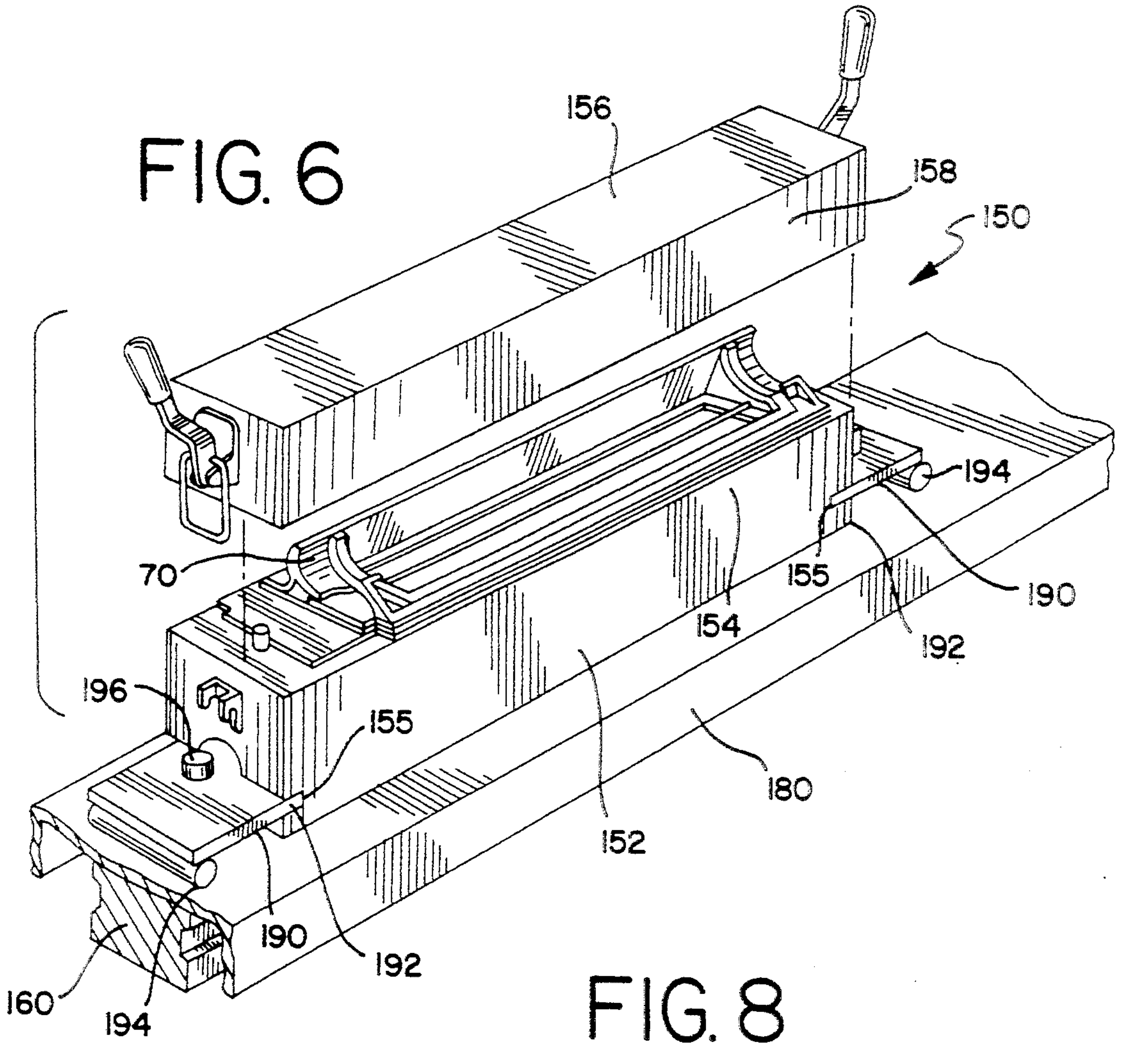
FIG. 6 is a perspective view of a cartridge subassembly being placed in a container.
Figure 8:
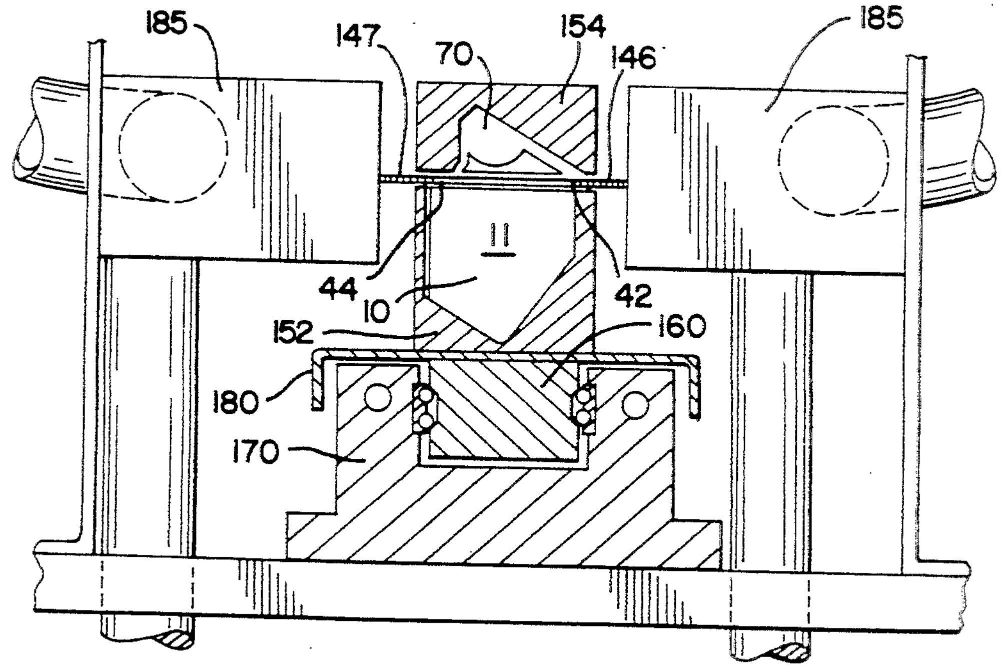
Figure 8 is a front sectional view of a pair of spaced-apart blades cutting away the outer edges of a cartridge gasket.
Figure 7:
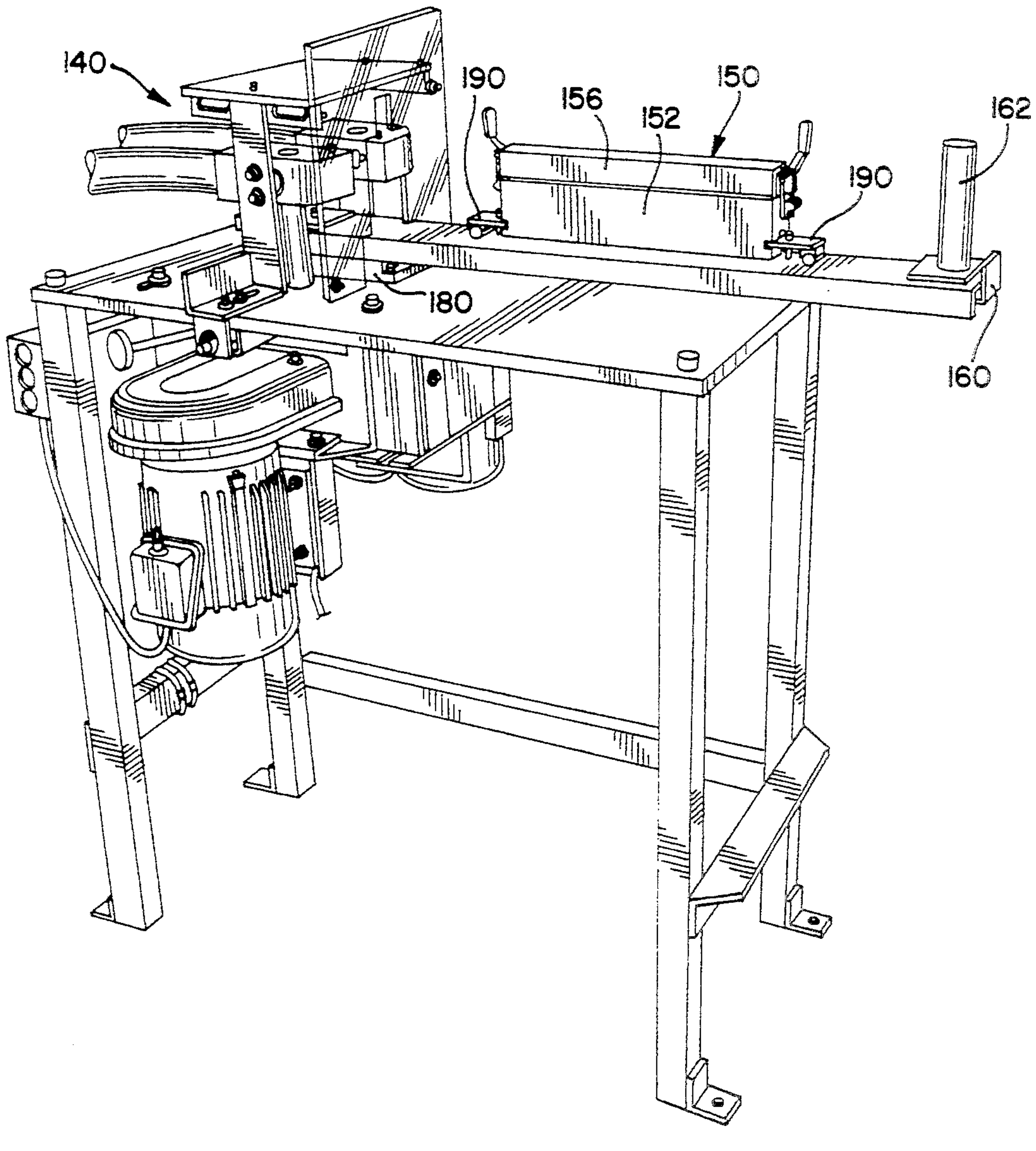
FIG. 7 is a perspective view of a container positioned on and secured to a rail.

In the first embodiment of the device 100, cartridge subassembly 11 is placed in a means for holding the cartridge such as a cart 120 (FIG. 3). In the second embodiment of the device 140, cartridge subassembly 11 is placed in a holding means such as a container 150 (FIG. 6). Cart 120 and container 150 are preferably made of two portions or halves. The first or bottom half (122 or 152) is provided with walls (124 or 154) shaped to snugly receive hopper bin 12 and uniformly engage hopper peripheral portions 18–21. Similarly, the second or top half (126 or 156) is provided with walls (128 or 158) shaped to snugly receive mounting member 70 and uniformly engage mounting member peripheral portions 78–81. These first (122 or 152) and second (126 or 156) portions are clamped together to securely hold cartridge subassembly 11. Hopper lengthwise outer edges 22 and 24, gasket lengthwise outer edges 42 and 44, and mounting member lengthwise outer edges 82 and 84 remain exposed.

In the first embodiment (FIGS. 4 and 5), the device 100 has a top referencing surface 102 upon which cart 120 rests, and a side positioning wall 104 from which a blade 106 projects. Cart 120 is sized to align blade 106 substantially even with and parallel to gasket 30. Blade 106 is preferably about 0.023 inches thick, slightly thicker than gasket 30 which is typically 0.020 inches thick. Blade 106 is also set to cut the gasket outer edge 42 a predetermined depth of about 3/16 of an inch. This is the cutting depth needed to cut away the lengthwise hopper-gasket and mounting member-gasket welds that join the subassembly 11 components together. Blade 106 cuts away the entire outer 3/16 inch portion of gasket outer edge 42. The depth of blade 106 should not be more than 3/16 inch because unnecessary damage to pins 75 or seals 77 could result.

Cart 120 is restricted to one-dimensional or linear movement past blade 106. Cart 120 is provided with at least one guide member, such as wheel 125, for facilitating linear forward movement of cart 120 over top referencing surface 102. A plate 107 having inside edge 107*a* is secured to top referencing surface 102 so that the edge is a predetermined distance from side positioning wall 104. This provides a track 110 in which wheel 125 will fit and roll. Track 110 is preferably 0.002 to 0.015 inches wider than wheel 125. This relatively small clearance prevents both the binding and the lateral movement of wheel 125 as it rolls through track 110, thereby ensuring a substantially constant blade depth.

A guide bar 108 projects from side wall 104 to prevent undesired vertical movement of cart 120. Guide bar 108 is located just high enough above surface 102 to allow wheel 125 to pass under the guide bar. A 0.002 to 0.003 inch clearance between the guide bar 108 and wheel 125 is preferred. This clearance allows wheel 125 to roll freely underneath guide bar 108, but prevents unwanted vertical movement of cart 120. Unrestricted vertical movement would cause blade 106 to move out of alignment with gasket 30.

Device 100 is also provided with a vacuum system 115 for removing waste debris while blade 106 cuts gasket 30. Vacuum system 115 prevents debris from collecting in track 110 and misaligning blade 106 with gasket 30 during cutting. A flexible strip 109, such as a mylar strip, is preferably provided to engage the side of cart 120 so that debris collects in a pocket above guide bar 108. The vacuum system 115 then removes the debris.

The height of blade 106 over surface 102 should be adjustable to ensure proper alignment of blade 106 with gasket 30. There are several brands and models of cartridges 5 being sold, and each cartridge has a differently shaped subassembly 11. Different carts 120 may be used to hold differently shaped subassemblies 11 and align them with blade 106.

Cart 120 makes two passes by blade 106, one for each side of the cart. The first pass cuts away gasket outer edge 42 to separate mounting member peripheral portion 78 from gasket surface 38*a*, and hopper peripheral portion 18 from gasket surface 38*b*. The cart is then turned 180 degrees and a second pass is made. This pass cuts away gasket outer edge 44 to separate mounting member peripheral portion 80 from gasket surface 40*a*, and hopper peripheral portion 20 from gasket surface 40*b*. Mounting member 70 should now be completely separated from gasket 30. If mounting member 70 is not completely separated, it may be manually pried apart by a worker as the majority of the mounting member-gasket weld has been removed.

Although the first embodiment of device 100 has been shown and described to include only a single blade 106, it should be understood that the device may include two spaced-apart blades. Blade 106 would cut away gasket outer edge 42 while a second blade (not shown) would cut away gasket outer edge 44 in a single pass.

In the second embodiment of the device 140 (FIGS. 6–11), container 150 is positioned on and secured to a rail 160. The rail 160 is mounted in a linear bearing 170 that only permits linear movement of the rail up and down the length of the bearing. A dust cover 180 and vacuum system 185 may be provided to cover the rail 160 and bearing 170 to prevent dust and waste debris from jamming the rail and bearing union.

Two "L-shaped" brackets 190 are used to position container 150 on rail 160. The bottom half 152 of each end of container 150 is provided with a slot 155. One end 192 of each bracket 190 engages one of the slots 155. A second end 194 of each bracket 190 engages a surface of the dust cover 180 or rail 160. A hole (not shown) is provided through the rail 160, dust cover 180 and bracket 190 for receiving a bolt 196. When container 150 is correctly positioned on rail 160, bolts 196 are tightened to secure container 150 to rail 160.

Linear bearing 170 is secured to a surface of the device 140 so that rail 160 is aligned between and substantially parallel to the surfaces of a pair of blades 146 and 147. Blades 146 and 147 are spaced apart slightly less than the width of gasket 30. Blade 146 is positioned to engage and remove approximately the outer 3/16 inch of gasket lengthwise outer edge 42. Blade 147 is positioned to engage and remove approximately the outer 3/16 inch of gasket lengthwise outer edge 44.

Figure 9:
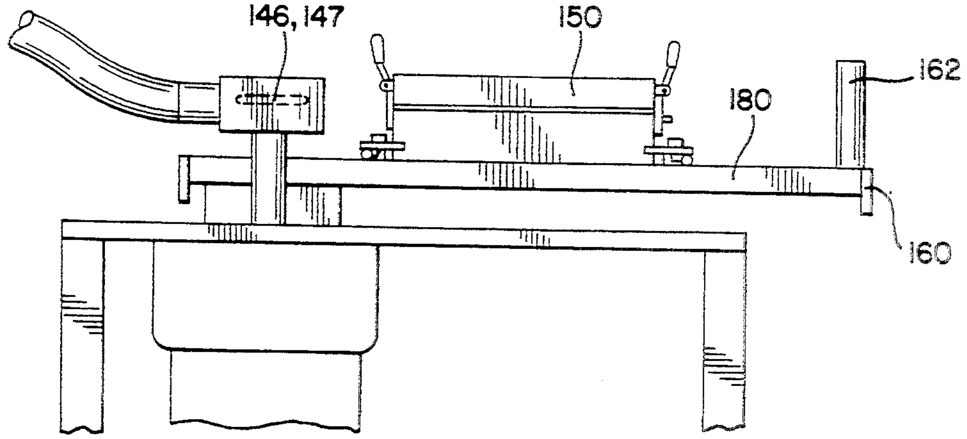
FIG. 9 is a side view of a container secured to a rail prior to moving past the blades of the device.
Figure 10:
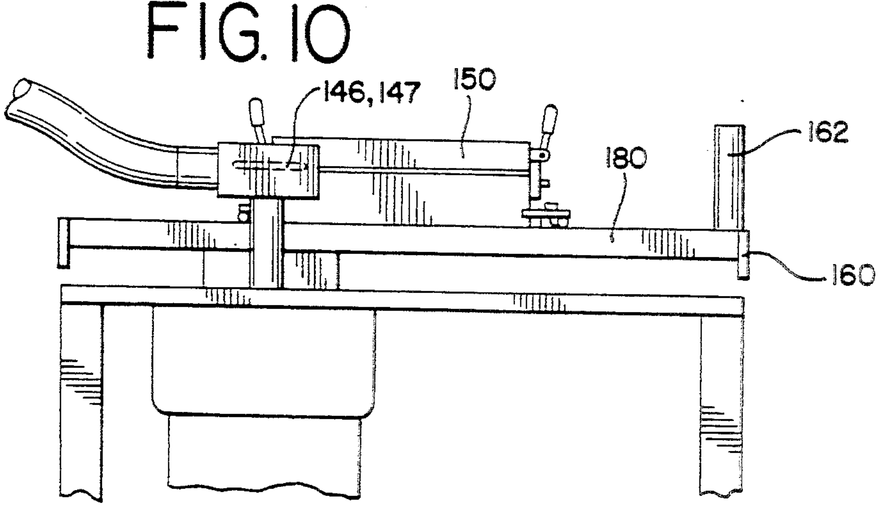
FIG. 10 is a side view of a container secured to a rail while moving past the blades of the device.
Figure 11:
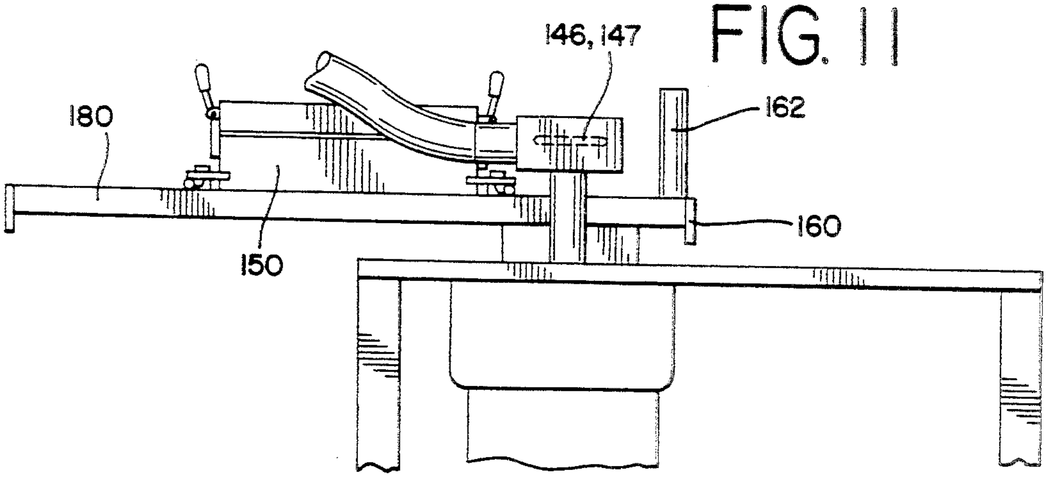
FIG. 11 is a side view of a container secured to a rail after moving past the blades of the device.

Rail 160 is pulled away from blades 146 and 147 when container 150 is secured to the rail as shown in FIG. 9. Once secured, an operator grasps handle 162 and moves rail 160 and container 150 linearly along bearing 170 and past blades 146 and 147. (See FIGS. 10 and 11). The operator then pulls the rail back to its original position. This single pass removes gasket outer edges 42 and 44 to separate mounting member peripheral portion 78 and 80 and hopper peripheral portion 18 and 20 from gasket 30.

The operator now releases the top half 156 of container 150 from the bottom half 152 and removes cartridge 11. Adjustments can be made to the height of the blades 146 and 147 and/or the position of container 150 on rail 160 to prevent damage to the peripheral portions 18–21 and 78–81 of the hopper 10 and mounting member 70, and to ensure that lengthwise gasket outer edges 42 and 44 are cut to their desired predetermined depths. Another similar cartridge 11 can then be placed in container 150 without loosening bolts 196 and repositioning the bottom half 152 of the container on rail 160.

Although devices 100 and 140 are preferred for holding, aligning and moving cartridge subassembly 11 linearly past blade 106 or 146 and 147, it should be understood that other holding, aligning and linear moving means are possible. In addition, although devices 100 and 140 have been shown and described to have a cutting means such as blades 106 or 146 and 147, it should be understood that other means for removing the outer edges of gasket 30, such as by melting or otherwise disintegrating outer edges 42 and 44, are possible.

It will be understood that the invention may be embodied in other specific forms without departing from the spirit or central characteristics thereof. The present examples and embodiments, therefore, are to be considered in all respects as illustrative and not restrictive, and the invention is not limited to the details given herein.

I claim:

1. A device for separating a toner cartridge having a hopper, a mounting member and a gasket, the hopper and mounting member having peripheral portions joined along the outer edge of the gasket, the device comprising:

means for removing the outer edge of the gasket;

a container shaped to accommodate the cartridge, wherein said container has first and second connectable halves, the cartridge being accommodated between said halves and each halve having walls, said walls of said first halve engaging the peripheral portions of the hopper and said walls of said second halve engaging the peripheral portions of the mounting member, said container allowing said removing means access to the outer edge of the gasket;

means for aligning the cartridge relative to said removing means, said removing means being aligned to engage the outer edge of the gasket; and means for moving the cartridge linearly relative to said removing means to cut away the outer edge of the gasket.

2. The device of claim 1, wherein said aligning means comprises a rail aligned with said removing means, said rail having means for positioning said container on said rail.

3. The device of claim 2, wherein said means for moving the cartridge linearly relative to said cutting means comprises a linear bearing in which said rail is mounted.

4. The device of claim 3, wherein said rail aligns the cartridge relative to said removing means to remove the outer edge of the gasket to a predetermined depth.

5. The device of claim 4, wherein said removing means includes first and second blades, said blades being spaced apart a predetermined distance, said rail being positioned between said blades, said first blade cutting away a first outer edge of the gasket to a predetermined depth and said second blade cutting away a second outer edge of the gasket to a predetermined depth.

6. The device of claim 1, wherein said container further includes a guide member, and said aligning means includes a reference surface, a positioning wall, a guide bar spaced a predetermined distance from said referencing surface to accommodate said guide member, and a plate spaced a predetermined distance from said positioning wall to accommodate said guide member.

7. The device of claim 6, wherein said container is a cart having wheels that engage said reference surface.

8. The device of claim 7, wherein said guide member is one of said wheels of said cart.

9. The device of claim 8, wherein said aligning means aligns the cartridge relative to said removing means to remove the outer edge of the gasket to a predetermined depth.

10. The device of claim 9, wherein said removing means is a blade that cuts away the outer edge of the gasket to a predetermined depth.

11. The device of claim 1, wherein said connectable halves are securely connected by clamping means.

12. The device of claim 6, wherein said guide bar restricts said guide member from vertical movement greater than said predetermined distance.

13. The device of claim 9, wherein said removing means includes a plurality of blades to cut away the outer edge of the gasket to a predetermined depth.

14. A device for separating a toner cartridge, the toner cartridge including a hopper, a mounting member and a gasket interposed between the hopper and the mounting member, the gasket being joined to both the hopper and the mounting member along the gasket outer edge to thereby join together the hopper and mounting member, the device comprising:

cutting means for removing the outer edge of the gasket to separate the hopper from the mounting member;

means for holding the cartridge, the holding means being shaped to accommodate the cartridge such that the cutting means only contacts the gasket outer edge and prevents the cutting means from contacting the hopper and the mounting member;

means for aligning the gasket outer edge in a substantially co-planar relationship with the cutting means; and means for moving the cartridge linearly relative to the cutting means while maintaining the substantially coplanar relationship between the gasket outer edge and the cutting means.

15. The device of claim 14, wherein said holding means comprises a container which limit vertical movement of the cartridge in the container, said container.

16. The device of claim 15, wherein said container has first and second connectable halves, the cartridge being accommodated between said halves and each half having said walls, said walls of said first half engaging the peripheral portions of the hopper and said walls of said second half engaging the peripheral portions of the mounting member.

17. The device of claim 16, wherein said aligning means comprises a rail aligned with said removing means, said rail having means for positioning said container on said rail.

18. The device of claim 17, wherein said means for moving the cartridge linearly relative to the cutting means comprises a linear bearing in which said rail is mounted.

19. The device of claim 18, wherein said rail aligns the cartridge relative to said cutting means to remove the outer edge of the gasket to a predetermined depth.

20. The device of claim 19, wherein said cutting means includes first and second blades, said blades being spaced apart a predetermined distance, said rail being positioned between said blades, said first blade cutting away a first outer edge of the gasket to a predetermined depth and said second blade cutting away a second outer edge of the gasket to a predetermined depth.

21. The device of claim 20, wherein said holding means comprises a container which limits vertical movement of the cartridge in the container.

22. The device of claim 21, wherein said container is a cart having wheels that engage said reference surface.

23. The device of claim 22, wherein said guide member is one of said wheels of said cart.

24. The device of claim 23, wherein said aligning means aligns the cartridge relative to said cutting means to remove the outer edge of the gasket to a predetermined depth.

25. The device of claim 24, wherein said cutting means is a blade that cuts away the outer edge of the gasket to a predetermined depth.

26. The device of claim 16, wherein said connectable halves are securely connected by clamping means.

27. The device of claim 21, wherein said guide bar restricts said guide member from vertical movement greater than said predetermined distance.

28. The device of claim 24, wherein said cutting means includes a plurality of blades to cut away the outer edge of the gasket to a predetermined depth.

* * * * *